United States Patent [19]

Golestani

[11] Patent Number: 5,121,383
[45] Date of Patent: Jun. 9, 1992

[54] DURATION LIMITED STATISTICAL MULTIPLEXING IN PACKET NETWORKS

[75] Inventor: S. Jamaloddin Golestani, Morristown, N.J.

[73] Assignee: Bell Communications Research, Inc., Livingston, N.J.

[21] Appl. No.: 615,014

[22] Filed: Nov. 16, 1990

[51] Int. Cl.⁵ .................... H04Q 11/04; H04L 12/56
[52] U.S. Cl. .................... 370/60; 370/85.6; 370/94.1
[58] Field of Search ............. 370/94.1, 94.2, 94.3, 370/60, 60.1, 61, 85.6, 79, 112; 340/825.5, 825.51

[56] References Cited

U.S. PATENT DOCUMENTS

| | | | |
|---|---|---|---|
| 4,472,801 | 9/1984 | Huang | 370/60 |
| 4,769,810 | 9/1988 | Eckberg, Jr. et al. | 370/94.1 |
| 4,769,811 | 9/1988 | Eckberg, Jr. et al. | 370/94.1 |
| 4,849,968 | 7/1989 | Turner | 370/94.1 |
| 4,912,702 | 3/1990 | Verbiest | 370/94.1 |
| 4,942,569 | 7/1990 | Maeno | 370/85.6 |
| 4,953,157 | 8/1990 | Franklin et al. | 370/94.1 |
| 4,993,025 | 2/1991 | Vesel et al. | 370/60 |

OTHER PUBLICATIONS

A Schedule-Based Approach for Flow Control in Data Communications Networks, U. Mukherji, PhD thesis, MIT, Dept. of Electrical Engineering and Computer Science, Cambridge, Mass., 1986.
"Maximum Delay in Buffered Multistage Interconnection Networks", Rene. L. Cruz, Proceedings of the INFOCOM, pp. 135-144, New Orleans, La., Mar. 1988.
"Circuit Emulations", C. K. Kim, S. H. Lee, and L. T. Wu, International Journal of Digital and Analog Cable Systems, pp. 245-256, 1988.
"Network Delay Considerations for Packetized Voice", P. M. Gopal, and Bharath Kadaba, Performance Evaluation, vol. 9, pp. 167-180, Jul. 1989.
"Congestion Control for Real-Time Traffic in High-Speed Networks", Henning Schulzrinne, James F. Kurose, and Don Towsley, Proceedings of the INFOCOM, pp. 543-550, San Francisco, Calif., Jun. 1990.
"Queuing Analysis of Delay Constrained Voice Traffic in Packet Switching System", Chin Yuan and John Silvester, IEEE Journal on Selected Areas of Communications, vol. SAC-7, No. 5, pp. 729-738, Jun. 1989.
"Markovian Queue with Bounded Waiting Time", Bezalel Gravish and Paul Schweitzer, Management Science, vol. 23, No. 12, pp. 1349-1357, Aug. 1977.

*Primary Examiner*—Douglas W. Olms
*Assistant Examiner*—H. Kizou
*Attorney, Agent, or Firm*—Leonard Charles Suchyta

[57] ABSTRACT

A method and associated node structure (11) for the efficient and reliable transmission of delay sensitive traffic in a packet network (10) is disclosed. The method provides bounded end-to-end delay for all delay sensitive traffic and can guarantee loss-free transmission to that part of the delay sensitive traffic which has such a stringent requirement. To achieve statistical multiplexing gain, some loss is permitted for the rest of the delay sensitive traffic, with discrimination among different loss priority classes based on the corresponding degree of loss sensitivity. Bounded end-to-end delay is obtained by performing statistical multiplexing at the switching nodes (11) on a duration limited basis through use of a unique queuing discipline at the network nodes (11). This queuing discipline is instrumental in guaranteeing loss free transmission for the class of traffic with such a requirement.

27 Claims, 8 Drawing Sheets

ARRIVING FRAMES OF TYPE 3 OR 4 OVER $\ell'$

FIG. 8B

ARRIVING FRAMES OF TYPE 1 OR 2 OVER $\ell'$

FIG. 8C

DEPARTING FRAMES OF TYPES 3 OR 4 OVER $\ell$

FIG. 8D

DEPARTING FRAMES OF TYPES 1 OR 2 OVER $\ell$

FIG. 9

DURATION LIMITED STATISTICAL MULTIPLEXING IN PACKET NETWORKS

RELATED APPLICATIONS

U.S. patent application Ser. No. 326,027 entitled "Congestion Free Packet Network" and filed on Mar. 20, 1989 for S. J. Golestani is assigned to the assignee hereof and contains subject matter related to the subject matter of the present application.

U.S. patent application Ser. No. 07/445,784 entitled "Congestion Management Based on Multiple Framing Strategy" and filed on Dec. 4, 1989 for S. J. Golestani is assigned to the assignee hereof and contains subject matter related to the subject matter of the present application.

The above-identified patent applications are incorporated herein by reference.

FIELD OF THE INVENTION

The present invention relates to a statistical multiplexing strategy and associated node structure for the efficient transmission of real-time traffic in packet networks taking into account both the delay and loss requirements of the traffic. In particular, the present invention relates to a statistical multiplexing strategy which provides loss and delay guarantees to different forms of real time traffic on an as needed basis. By exploiting the loss and delay tolerance of each class of traffic in the process of statistical multiplexing, higher network utilization becomes possible.

BACKGROUND OF THE INVENTION

A packet switching network comprises a plurality of nodes interconnected by links. Typically, the packet switching network supports a plurality of connections, each of which interconnects and transmits packets between a source node and a destination node.

Telecommunications services differ greatly in their tolerance of packet losses and packet delays. In an integrated services packet network, some of the applications, such as most forms of data communications, are not delay-sensitive but may have stringent loss requirements. The lack of delay sensitivity, however, permits the recovery of packet losses through retransmission. Other applications, such as interactive voice and video, involve real-time traffic and require delivery of their packets within a short period of time. These delay sensitive applications have various degrees of loss sensitivity as well. Unfortunately, packet loss recovery through retransmission typically is not fast enough to be useful in the case of delay sensitive traffic. Therefore, alternative strategies for preventing packet losses need to be utilized for these types of traffic.

The above-identified patent applications describe a congestion free transmission strategy for a connection oriented packet network. The congestion free transmission strategy guarantees a bounded end-to-end delay for any packet being transmitted from a source node to destination node of a connection. This transmission strategy is also loss free in that buffer overflow at the network nodes is eliminated. (See also U. Mukherji, A Schedule-Based Approach For Flow Control In Data Communication Networks, PhD thesis, MIT, Dept. of Electrical Engineering and Computer Science, Cambridge, Mass., 1986; Rene, L. Cruz, "Maximum Delay in Buffered Multistage Interconnection Networks," Proceedings Of The INFOCOM, pp 135-144, New Orleans, La., March 1988; C. K. Kim, S. H. Lee, and L. T. Wu, "Circuit Emulations," International Journal Of Digital And Analog Cable Systems, 1988, pp 245-256; and P. M. Gopal and Bharath Kadaba, "Network Delay Considerations for Packetized Voice," Performance Evaluation, Vol. 9, pp 167-180, July 1989, for other transmission schemes which offer bounded end-to-end delay).

The congestion free transmission strategy of the above-identified patent applications is composed of two parts. A packet admission policy is imposed for each connection at its source node (i.e. a policy which controls the admission of packets for each connection into the network) and a queuing discipline is imposed at the network nodes.

In the congestion free transmission strategy of the above-identified patent applications, packets may be viewed as being transmitted between nodes via internal links in time frames. Thus, on each internal link in the network, successive time intervals or frames of duration T are defined. These frames may be viewed as logical containers which propagate from the transmitting end to the receiving end of a link. Similarly, packets for a particular connection may be viewed as entering the network from the outside world at a source node of the connection via an access link. Successive time frames of duration T may also be defined for the access links.

The admission policy for packets belonging to a particular connection k is that an upper limit is imposed on the aggregate length of packets admitted to the network for the particular connection k at its source node during each frame. More particularly, if the time frames have a duration T, the aggregate length of packets which can be admitted to the network for the connection k via an access link at its source node is $r_k T$ where $r_k$ is a transmission bandwidth allocated to the connection k. The bandwidth $r_k$ is allocated to a connection k such that the sum of the rates allocated to the connections traversing each link in the network do not exceed the capacity of that link. This packet admission policy amounts to imposing a smoothness requirement on the packet stream of a connection at its source node. (In the absence of such an admission policy, packets of a packet stream may enter the network in dense burst).

The queuing policy which is utilized at the network nodes in the congestion free transmission strategy of the above-identified patent applications is as follows. A packet which arrives at a node on a given incoming link in a specific arriving time frame is delayed at the node at least until the specific arriving frame expires and is transmitted o the appropriate outgoing link in the first departing frame which starts after the specific arriving frame expires. This queuing policy serves to maintain the smoothness of each connection in the network over each link traversed by a connection.

As the packet stream of each connection over each link traversed by a connection is maintained as smooth, there is no congestion in the network. Thus in the congestion free transmission strategy of the above-identified patent applications, packet losses are eliminated and a guaranteed end-to-end delay for each packet of each connection is achieved.

While the congestion free transmission strategy of the above-described patent applications has significant advantages (i.e. guaranteed bounded end-to-end packet transmission delays and elimination of packet losses), the above-described congestion free transmission strategy does suffer from a shortcoming in that it results in an under-utilized network. The reason is that while there is a maximum limit imposed on the aggregate length of packets which can be admitted to the network at the source node of each connection during a time frame of duration T, the reality is that in many time frames, packets with less than this aggregate length will be admitted.

Accordingly, it is an object of the present invention to modify the above-described congestion free transmission strategy to increase network utilization.

Improvement of network utilization in the presence of bursty packet traffic takes place through the process of statistical multiplexing, which tends to average out the statistical fluctuations of individual traffic streams. However, statistical multiplexing is responsible for two service impairments. These are packet losses and increased packet delay. As indicated previously, the degree of tolerance of various telecommunications services with respect to packet loss and packet delay is widely different.

In a conventional statistical multiplexing process it is possible to roughly distinguish between two elements, both of which contribute to an overall multiplexing gain. The two elements are averaging the traffic over different connections and averaging over time. When a number of packet streams are added up in a multiplexer, the peaks and valleys of the instantaneous transmission rates of the individual streams mix together, forming a smoother aggregated traffic stream, thereby permitting a higher transmissing efficiency. Since this aggregated traffic still has some fluctuations, further multiplexing gain becomes possible by averaging out its fluctuations over time, through a queuing mechanism. If the duration of the time over which traffic averaging takes place is not carefully regulated, this second element of statistical multiplexing can lead into long and, often unpredictable, end-to-end packet transmission delays. (See, e.g. Henning Schulzrinne, James F. Kurose, and Don Towsley, "Congestion Control for Real-Time Traffic in High-Speed Networks," Proceedings Of The INFOCOM, pp 543-550, San Francisco, Calif., June 1990; Chin Yuan and John Silvester, "Queuing Analysis of Delay Constrained Voice Traffic in a Packet Switching System," IEEE Journal On Selected Areas Of Communications, Vol. SAC-7, No. 5, pp 729-738, June 1989; and Bezalel Gavish and Paul Schweitzer, "The Markovian Queue with Bounded Waiting Time," Management Science, Vol. 23, No. 12, pp 1349-1357, August 1977 for some prior art solutions to this problem.)

In view of the foregoing, it is an object of the present invention to provide statistical multiplexing on a limited duration basis and to combine such duration limited statistical multiplexing with the congestion free packet transmission strategy of the above-identified patent applications to achieve 1) the high level network utilization provided by statistical multiplexing, 2) the bounded end-to-end delay guarantees provided by the congestion free transmission strategy, 3) loss free transmission for the part of the traffic with such a requirement, and 4) loss performance for the rest of the traffic on an as needed basis. The combination of the congestion free transmission strategy of the above-identified patent applications and statistical multiplexing is unobvious and has not been achieved heretofore. As is shown below, this combination results in unexpected advantages for the transmission of packets in a packet switching network.

It is also an object of the present invention to provide a transmission strategy for packets in a packet switching network which provides loss and delay guarantees to different forms of traffic on an as needed basis.

SUMMARY OF THE INVENTION

The present invention is a statistical multiplexing process for efficiently transmitting packets in a packet switching network. In comparison to the congestion free transmission strategy described in the above-identified patent applications, the present invention utilizes a different queuing policy at the network nodes and a different admission policy for admitting packets into the network. The inventive transmission strategy provides loss and delay guarantees to different forms of packet traffic on an as needed basis.

As in the congestion free transmission strategy, in accordance with the present invention, packets may be viewed as being transmitted between nodes via links in logical containers identified herein as time frames of fixed duration T.

In accordance with the present invention, each packet includes a loss priority class indicator p. There are P loss priority classes so that p can take on the values $P=1, \ldots, P$. Illustratively, $p=P$ indicates the class of packets which can tolerate the least losses and $p=1$ indicates the class of packets which can tolerate the most losses. Desirably, packets of the highest loss priority class (i.e., $p=P$) are loss free.

A connection in the network may be associated with the loss priority classes of the network in a variety of ways depending on, for example, the amount of packet losses which can be tolerated by the application without an unacceptable degradation of service. For example, one way to set up a connection in the network is to assign all packets from the connection to a particular loss priority class in which case this loss priority class will be assigned to each admitted packet for that connection. Another alternative is to assign different packets from the same connection to different loss priority classes as determined in advance by the traffic source or as determined by existing network conditions at the time of packet admission.

The queuing discipline used at the network nodes in accordance with the present invention is as follows. A packet which arrives at a node on a given incoming link in a specific arriving frame is delayed at the node at least until the incoming frame expires. The packet becomes eligible for transmission on the appropriate outgoing link in the first departing frame on that outgoing link which starts after the specific incoming frame expires. The duration of a specific departing frame of a particular outgoing link is allocated to packets eligible for transmission therein as follows: first to packets of the highest loss priority class (i.e. $p=P$) and then to packets in successive lower loss priority classes as time within the frame permits. If the specific outgoing frame expires before all the packets eligible for transmission in it have in fact been served, the non-transmitted packets are dropped. An important result of this queuing discipline at the network nodes is that any packet which is not dropped has a guaranteed bounded end-to-end transmission delay from its source node to its destination node.

The above-described queuing discipline at the network nodes is a statistical multiplexing operation in which the multiplexing time is limited to the duration of a frame. Thus, the inventive transmission strategy is known as duration limited statistical multiplexing.

As previously indicated, the inventive packet transmission strategy includes, in addition to the above-described queuing discipline, an admission policy for connections and their associated packets into the network. The purpose of the connection and packet admission policy is to determine connections which can be accepted into the network while maintaining an acceptable quality of service for ongoing calls. An additional purpose of the admission policy is to provide the traffic in the p=P loss priority class with essentially loss-free transmission.

The admission policy is as follows. A connection k comprising packets in the loss-free class (i.e., p=P) is admitted to the network if a requested transmission bandwidth $r_k$ is available for the connection on each link of a path in the network between the source node and the destination node. The requested transmission bandwidth $r_k$ is chosen so that the aggregate length of the packets in the loss-free class for the connection k does not exceed $r_k.T$ bits during each time frame of duration T on the access link of the connection k leading to its source node. For fixed length packets, $r_k$ may be expressed equivalently as a number of packets per frame $\beta_k$. The sum of the transmission bandwidths allocated to connections with packets in the loss-free class on any link l in the network should not exceed the overall capacity of the link $C_l$.

When transmission capacity is allocated to connections in this manner, the packets in the loss-free class are guaranteed to be transmitted from a source node to a destination node with no losses due to buffer overflow and with a bounded end-to-end transmission delay.

In addition to the foregoing rule for allocating transmission capacity to connections with packets in the loss free class, in accordance with the present invention, a new connection, whether or not it contains packets in the loss free class, is admitted to the network, only if its admission will not modify the loss rate of any existing connection in such a way that an existing connection will have its end-to-end packet loss rate probability increased beyond its tolerance.

The admission policy of the invention also insures that an expected grade of service in terms of the encountered packet loss rate will be maintained for the traffic in the lower loss priority classes.

When a connection comprising packets in a specific lower loss priority class seeks admission to the network, it is necessary to determine what the end-to-end loss rate probability of the new connection would be if the new connection were to be admitted to the network to make sure that the end-to-end loss rate probability is within the acceptable tolerance. The impact of the new connection on the loss rates of already existing connections in the network is also determined as indicated above. These determinations may be made from the statistical distribution of packets for the new connection which is expected to be known a priori, and the statistical availability of bandwidth on particular links to be utilized by the new connection. The statistical availability of bandwidth on a particular link is determined by the statistical distribution of packets in already existing connections utilizing the particular link and from the queuing discipline used at the network nodes.

The net result of the inventive duration limited statistical multiplexing transmission strategy is that packets in the loss-free class are transmitted through the network without losses and with a guaranteed bounded end-to-end delay while packets in the lower loss priority classes also have a bounded end-to-end delay along with loss rates which are acceptable for the corresponding applications.

While in one embodiment of the inventive transmission strategy a uniform frame size of duration T may be utilized throughout the network, in an alternative embodiment, multiple frame sizes may be utilized, with packets from different connections being transmitted in different sized frames. In this embodiment, each frame size may be associated with one or several different traffic groups, with each traffic group having a guaranteed fraction of the transmission resources on each link in the network.

DETAIL DESCRIPTION OF THE INVENTION

The detailed description of the invention is divided into a plurality of subsections. Subsection A describes a packet network configuration and the time frames and loss priority classes which are utilized in the duration limited statistical multiplexing transmission strategy of the present invention. Subsection B describes the queuing discipline used at the network nodes in the duration limited statistical multiplexing transmission strategy of the present invention. Subsection C describes the admission policy for connections and packets into the network in the duration limited statistical multiplexing transmission strategy. Subsection D describes the use of multiple traffic groups in the inventive duration limited statistical multiplexing transmission strategy and subsection E describes the use of heterogenous time frames in the inventive duration limited statistical multiplexing transmission strategy.

A. Packet Network Configuration

Figure 1:
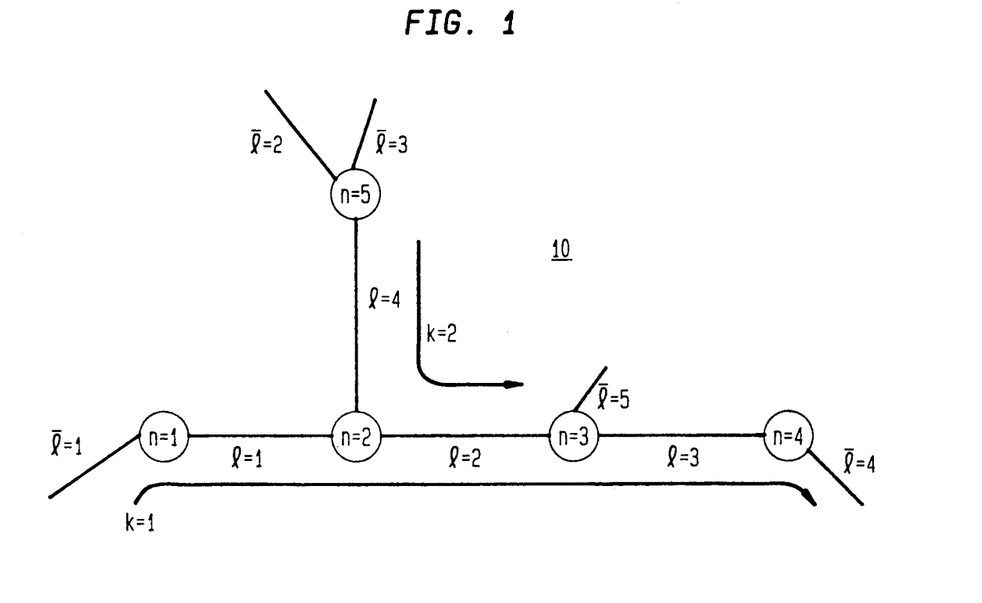
FIG. 1 schematically illustrates a packet switching network.

FIG. 1 schematically illustrates a packet switching network 10. The network 10 comprises the nodes $n = 1, \ldots, N$, where $N = 5$. The network 10 also comprises the internal links $l = 1, \ldots, L$, where $L = 4$. Connecting the network 10 to the outside world are the access links $\bar{l}$ when $\bar{l} = 1, \ldots, \bar{L}$, where $\bar{L} = 5$. Illustratively, two connections are shown in FIG. 1. The connection $k = 1$ includes the access link $\bar{l} = 1$ and extends from the source node $n = 1$, through the intermediate nodes $n = 2$ and $n = 3$, and to the destination node $n = 4$ and access link $\bar{l} = 4$. Thus, the connection $k = 1$ utilizes the internal links $l = 1, 2, 3$. Similarly, the connection $k = 2$ includes the access link $\bar{l} = 2$ and extends from the source node $n = 5$, through the intermediate node $n = 2$, and to the destination node $n = 3$ and access link $\bar{l} = 5$. Thus, the connection $k = 2$ utilizes the internal links $l = 4$ and $l = 2$.

Central to the duration limited statistical multiplexing strategy of the present invention are the notions of time frames and loss classes. Consider a packet network with nodes $n = 1, \ldots, N$, internal links $l = 1, \ldots, L$, and access links $\bar{l} = 1, \ldots, \bar{L}$. The capacity of an internal link $l$ in bits per second is denoted by $C_l$. The sum of the propagation delay of each internal link $l$ plus the processing and switching time at the receiving end of the link $l$ is $\tau_l$. The quantity $\tau_l$ may be referred to as the delay of the internal link $l$.

Time frames are defined as successive time intervals of duration T and are viewed over each internal or access link as logical containers within which packets are transmitted. An arbitrary time-origin may be assigned for each link and the time frames for that link are defined with respect to the time origin. The time frames are viewed as traveling with the packets from the transmitting end of the link to the receiving end of the link and onto the processing and switching device at the receiving end. Therefore, the arriving frames at the receiving end of link $l$ are $\tau_l$ seconds behind the departing frames at the transmitting end of the link $l$.

Figure 2:
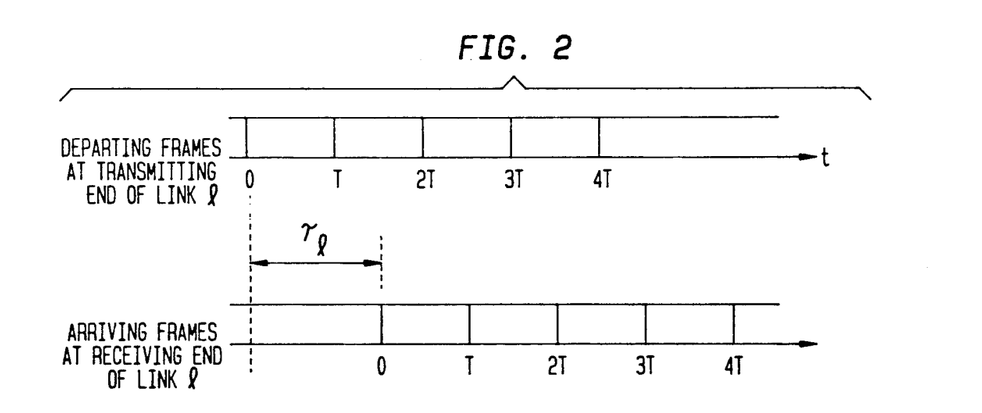
FIG. 2 schematically illustrates arriving and departing frames on a link in the network of FIG. 1.

FIG. 2 schematically illustrates departing frames of duration T at the transmitting end of a link $l$ in the network of FIG. 1 and these same frames as they arrive at the receiving end of the link $l$. As shown in FIG. 2 the arriving frames at the receiving end are $\tau_l$ seconds behind the departing frames.

At a node n in a packet switching network, the arriving and departing frames over different incoming and outgoing links need not be synchronous due to the arbitrary choice of link time origins and the arbitrary value of link propagation delays.

Figure 3A:
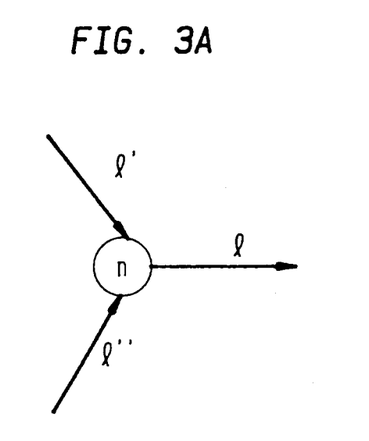
FIG. 3A shows a node in the network of FIG. 1 having two incoming links and one outgoing link.
Figure 3B:
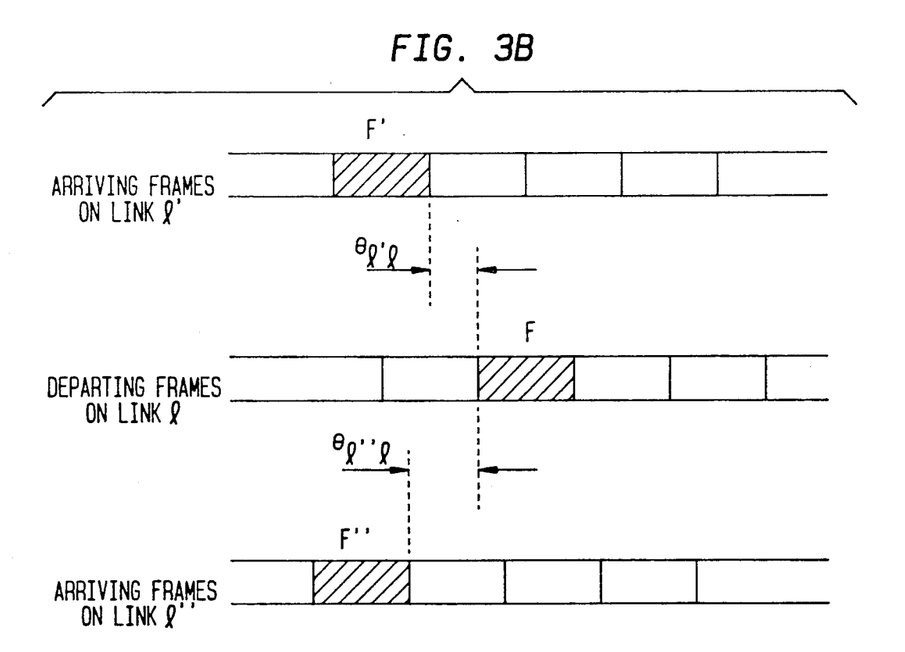
FIGS. 3B shows the relationship between the frames on the incoming and outgoing links of the node of FIG. 3A.

FIG. 3A shows a node n with the incoming links $l'$ and $l''$ and the outgoing link $l$. FIG. 3B shows the arriving frames on the incoming links $l'$ and $l''$ at the node n and the departing frames on the outgoing link $l$. At a node n, an arriving frame F' of an incoming (or access) link $l'$ and a departing frame F of an outgoing link $l$ comprise an adjacent pair, if F is the first departing frame of $l$ that starts at or after the expiration of F'. In FIG. 3B, $\theta_{l'l}$ represents the time between (i.e. the phase mismatch between) the expiration of the arriving frame F' on link $l'$ and the start of the adjacent departing frame F on link $l$. Similarly, $\theta_{l''l}$ represents the phase mismatch between the expiration of an arriving frame F'' on link $l''$ and the start of an adjacent departing frame F on link $l$. The phase mismatch of any pair of incoming and outgoing links at a node is between zero and T.

As indicated previously, each packet contains a loss priority class indicator. Packets are accepted into the network and transmitted in one of P loss priority classes denoted by $p = 1, \ldots, P$. The class $p = P$ is the class with the highest loss priority and is a loss free class. The class $p = 1$ is the lowest loss priority class and has the highest loss rate. The value of p for a packet is carried in its header. Different loss priority classes are provided in the inventive duration limited statistical multiplexing transmission strategy so that loss requirements can be accommodated on an as needed basis.

B. Queuing Discipline at the Network Nodes

The queuing discipline used at the network nodes in the inventive duration limited statistical multiplexing transmission strategy is now considered in detail. The purpose of the queuing disciple used in the duration limited statistical multiplexing strategy is two-fold. One goal is to guarantee bounded delay and loss-free transmission for the packets in the loss-free ($p = P$) class. A second purpose is to provide bounded delay transmission to the rest of the traffic, while making sure the loss performance of traffic in any specific loss priority class is not affected by the volume of traffic in the loss priority classes below the specific loss priority class.

The queuing disciple at the network nodes is based on the following rules:

a. Consider a node n, an incoming link $l'$, an outgoing link $l$, and a packet which has arrived at the node during an arriving frame F' of link $l'$ and which seeks service by outgoing link $l$. Let F be the departing frame of the outgoing link $l$ that is adjacent to the arriving frame F' on the incoming link $l'$. The packet does not become eligible for transmission by the outgoing link $l$ until the beginning of frame F.

b. The eligible packets belonging to a higher loss priority class should be offered service before packets belonging to a lower loss priority class.

c. Any eligible packet which does not receive service by the end of the adjacent frame will be dropped.

Implementation of this queuing discipline is particularly simple when the arriving frames of all the incoming links are synchronous. In this case, the phase mismatch between an outgoing link $l$ and any one of the incoming links to the node is the same, i.e., $\theta_{l'l} = \theta_l$ for all incoming and outgoing link pairs $(l', l)$. This means that any packet which has arrived at the node at least $\theta_l$ seconds prior to the beginning of a departing frame F is eligible for transmission during the departing frame F, regardless of the particular incoming link over which it arrived.

Figure 4:
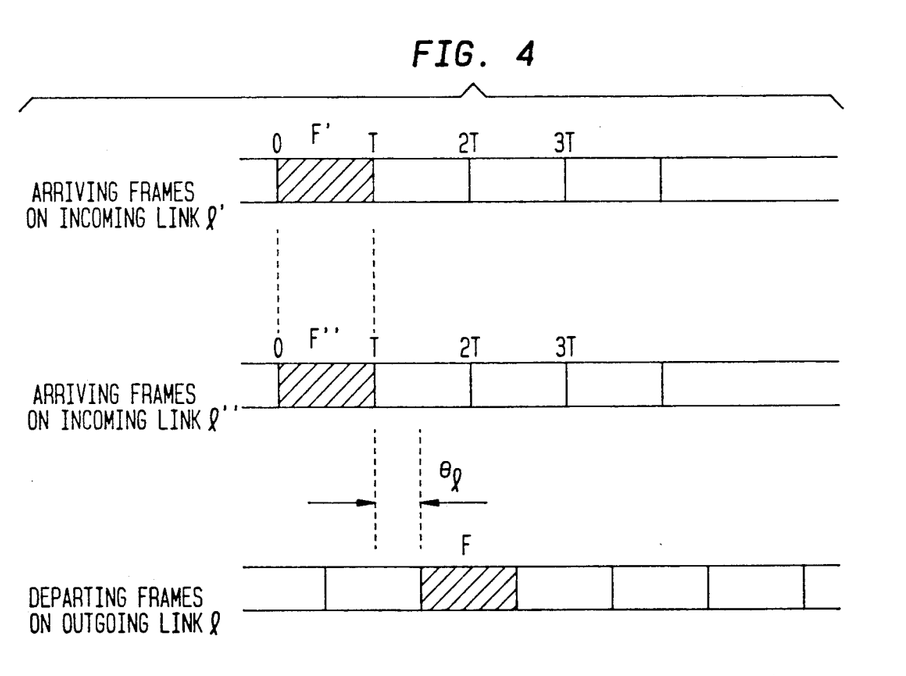
FIG. 4 shows the relationship between the frames on the incoming and outgoing links of the node of FIG. 3A when the frames on the incoming links are synchronous.

As indicated above, FIG. 3A shows a node n with incoming links $l'$ and $l''$ and outgoing link $l$. FIG. 4 shows synchronous arriving frames on the incoming links $l'$ and $l''$, and the departing frames on the outgoing link $l$. FIG. 4 also shows the phase mismatch $\theta_l$ between the synchronous arriving frames F' and F'' on the incoming links $l'$ and $l''$ and the adjacent departing frame F on the outgoing link $l$.

Figure 5:
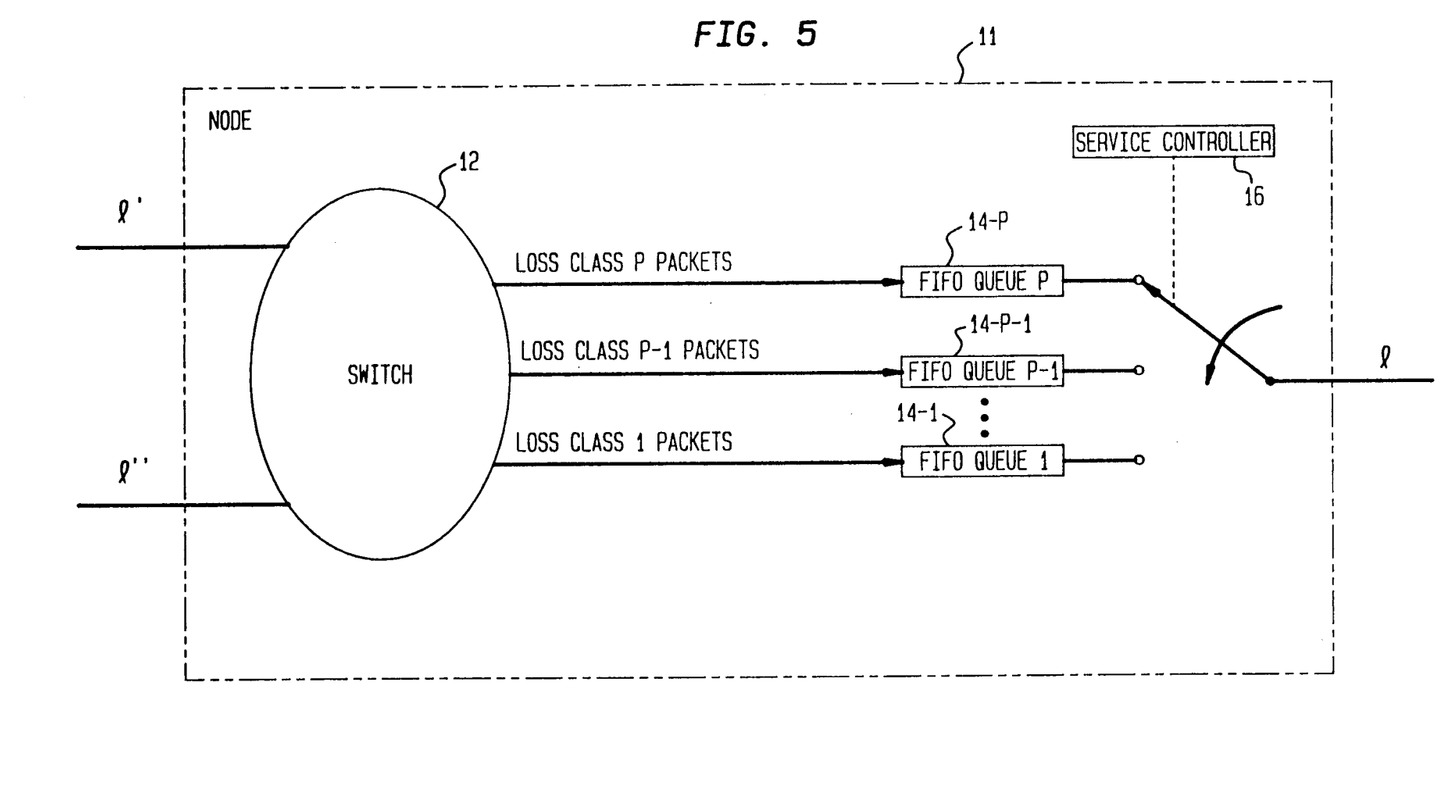
FIG. 5 schematically illustrates the structure of a node of the network of FIG. 1 when the duration limited statistical multiplexing transmission strategy is utilized, in accordance with an illustrative embodiment of the present invention.

FIG. 5 shows a node structure 11 for implementing the above-described queuing discipline. In particular, the node 11 of FIG. 5 includes the incoming links $l'$ and $l''$ and the outgoing link $l$. In general, a node will have more incoming and outgoing links but only the links $l'$, $l''$ and $l$ are shown in FIG. 5 for simplicity. Associated with the link $l$ in the node 11 is a set of FIFO queues $14\text{-}1, \ldots, 14\text{-}P\text{-}1, 14\text{-}P$. These FIFO queues are associated with the corresponding loss priority classes $p = 1, \ldots$ ..., P-1, P, respectively. The node 11 also includes a switch 12 for routing packets arriving on any of the incoming links and addressed to the outgoing link 1 to the appropriate one of the FIFO queues 14-1, ..., 14-P associated with the outgoing link 1. A packet is routed to a specific queue 14 by the switch 12 based on the loss class indicator contained in its header.

At a time $\theta_l$ seconds prior to the beginning of each departing frame F on link 1 (see FIG. 4), the service controller 16 designates the loads present in the queues 14 as eligible for transmission during the departing frame F. This can be done simply by marking the last packet in each queue 14 at that moment. Any packet which arrives afterward is not eligible for transmission during the departing frame F and should wait until a subsequent frame. During the departing frame F, the service controller starts by offering service to the packets of loss priority class P in queue 14-P and then to the packets of loss priority class P-1 in queue 14-P-1 and then to the packets of loss class P-2 in queue 14-P-2, etc. until either the departing frame F expires or no eligible packet is left. When no eligible packet is left, the service controller 16 remains idle until the beginning of the next departing frame on the outgoing link 1. If all eligible packets in the queues 14-1, ..., 14-P cannot be served by the time departing frame F expires, the eligible packets remaining at the end of F are dropped. At the beginning of the next departing frame on the outgoing link 1, when new packets become eligible, the service again starts from the queue 14-P. It should be noted, that with the above-described queuing discipline, there is no need for monitoring the traffic of individual connections. The function of the service controller 16 is based instead on the aggregated traffic of each loss priority class. This characteristic makes implementation of a node for carrying out the inventive duration limited statistical multiplexing strategy especially simple because it permits the use of the FIFO queues of FIG. 5.

C. Connection and Packet Admission

The queuing discipline at the network nodes is utilized in combination with a connection and packet admission policy. A connection k is defined as a stream of packets going from a given source node to a given destination node via one or more links in the network. A connection in the network ma be associated with the loss priority classes of the network in a variety of ways depending, for example, on the amount of packet losses which can be tolerated by the application without an unacceptable degradation of service. Illustratively, all packets from a connection may be assigned to a particular loss priority class or different packets from the same connection may be assigned to different loss priority classes.

One purpose of connection admission is to insure that packets belonging to the highest loss priority class p = P are transmitted from their source node to their destination node without loss. Another purpose of connection admission is to determine connections that can be admitted to the network while maintaining a acceptable quality of service for the lower priority packets.

Connections and their associated packets are admitted to the network as follows:

1) A connection k comprising packets in the loss-free class (p = P) can be admitted to the network only if a requested transmission bandwidth $r_k$ is available on each link of a path in the network between the source node and the destination node of the connection k. The requested transmission bandwidth $r_k$ is chosen so that the aggregate length of packets in the loss-free class for the connection k is less than or equal to $r_k T$ bits in any frame of duration T on its access link leading to the network. On any link 1 in the network, the sum of the transmission bandwidths allocated to connections with packets in the loss-free priority class should not exceed the overall capacity of the link $C_l$.

2) A new connection is admitted to the network only after making sure that admission of such a new connection will not modify the loss rate of any existing connection in such a way that one or more of the existing connections will have its end-to-end packet loss rate probability increased beyond its tolerance.

3) In addition, a connection with packets in a lower loss priority class is admitted to the network only if the encountered end-to-end packet loss rate probability will be within the end-to-end loss rate probability tolerance of the connection.

In general, packet loss rate probabilities are determined by the queuing discipline used at the network nodes and the statistical distribution of packets which is known a priori for each connection. It should be noted that the queuing discipline used at the network nodes greatly simplifies the determination of packet loss rate probabilities and the connection admission decisions. The reason is that the queuing discipline prevents packet clustering beyond the boundaries of frames, i.e., the traffic contained in one time frame cannot slide into another frame.

When transmission capacity is allocated to packets in the loss-free class in this manner, a total buffer size associated with each link of no more than $3C_l T$ insures that all packets in the loss-free class are guaranteed to be transmitted in a loss-free manner from their source node to their destination node. The packets in the loss-free class are also provided with a bounded end-to-end delay. In particular, the total queuing delay for a connection k comprises a constant delay term between HT and 2HT (which is fixed for the connection) and a jitter delay term which is between $-T$ and $+T$. Here, H is the number of links in the connection k. In addition, packets belonging to a connection k will preserve their order throughout the network, regardless of the differences in their priorities, given that during any arriving frame on the access link of connection k, the admitted packets of the connection k which have a higher priority precede those packets of k which have a lower priority. Furthermore, the loss probability of a packet with priority p > 1 is not affected by the traffic with priority p' < p.

Consider the following example in which all of the packets are of a fixed length. Suppose in a given network there are two priority classes, a loss-free priority class p = 2, and a lower loss priority class p = 1, whose packets can withstand an end-to-end loss rate probability of Q. Each connection in the network has only one type of packet, i.e., all the packets of a connection belong to the p = 2 class or the p = 1 class. Assume that the initial state of the network is that there are only p = 2 type connections in the network. As indicated above, each of these p = 2 type connections k has an allocated transmission bandwidth $r_k$ on each link in the network through which it passes. Note, when all packets are the same size the allocated transmission bandwidth $r_k$ in bits per second can also be expressed equivalently as $\beta_k$ in packets per frame. The actual number of packets in a frame of duration T for a p = 2 type connection k is statistically characterized by a mean $\alpha_k$ and a standard deviation $\sigma_k$. Higher order statistics may also be utilized. For a connection k in the loss free class p=2, the parameter $\beta_k$ represents the maximum number of packets which can be present in a frame of duration T, but $\alpha_k$ and $\sigma_k$ characterize the actual transmission capacity utilized so that $\alpha_k$ is less than $\beta_k$ unless the connection k is totally smooth. Thus, even if $\Sigma\beta_k$ for all the connections in the loss free class p=2 on a link l equals $C_l$, in any given frame, statistically there is some transmission capacity available. From the information $\beta_k$, $\alpha_k$, $\sigma_k$ known for each connection k, it is statistically determined on each link in the network how much transmission capacity is actually utilized per frame and how much transmission capacity is available per frame.

Now consider the possibility of admitting a type p=1 connection k' to the network. The connection k' can tolerate an end-to-end packet loss rate probability of Q. The connection k' is characterized by statistical variables $\alpha_k'$ and $\sigma_k'$ which are the mean number of packets per frame and the standard deviation. As indicated above, higher order statistics may also be utilized. On each link l in a path between the source node and the destination node for the connection k', a loss rate probability for the connection k' is determined. This loss rate probability is calculated from the statistically known available transmission capacity on the link l and the statistical quantities $\alpha_k'$ and $\sigma_k'$ which characterize the number of packets per frame of the connection k'. The loss rate probabilities for each individual link in the path for the connection k' are then summed to obtain an end-to-end loss rate. If the end-to-end loss rate is smaller than Q, the connection k' is admitted.

Assuming that the connection k' has been admitted to the network, consider the possibility of adding another type p=1 connection k" to the network. If the connection k" does not use any link in common with connection k', the analysis is the same as for the connection k'. If, however, the connection k" has a path which utilizes some links in common with the connection k', then the impact of connection k" on connection k' should also be considered.

The reason for this is that on any link in the network, when the inventive queuing discipline is utilized, the loss rate probability for loss priority class p=1 packets depends on the aggregate total of p=1 packets and aggregate total of p=2 packets waiting for service by that link in its departing frames and not the number of packets from any individual connection. Thus, by introducing p=1 type packets from the connection k" onto a particular link already having packets from the connection k', the loss rate probability on that link for packets from k' may increase to an unacceptable level. Thus, on a link which connections k' and k" would use in common, it is necessary to determine statistically from the type p=2 packets the available transmission capacity on the link for p=1 type packets and an aggregate loss probability for p=1 type packets from $\alpha_k'$, $\alpha_k''$, $\sigma_k'$, and $\sigma_k''$. It is then determined how this aggregate loss probability changes the end-to-end packet loss rate probability for connection k' and how this aggregate loss probability contributes to the end-to-end loss rate probability for connection k". If the modified end-to-end loss rate for connection k' will not exceed Q and the end-to-end loss for connection k" is less than Q, connection k" may be admitted to the network.

D. Multiple Traffic Groups

In the queuing discipline described in section B above, all of the connections share a common pool of resources. Consequently, while a packet of loss class priority p is protected against the traffic of lower loss priority classes, it remains vulnerable to the traffic of the same or of higher loss priority classes. The obvious exception is a packet of the highest loss priority class p=P, which is guaranteed to have loss-free transmission. If the statistical behavior of the traffic of some applications is not sufficiently known, it becomes difficult to guarantee a particular loss performance to any other traffic with the same or with a lower loss priority class. Therefore, it is desirable to provide a transmission strategy which allows for more isolation among traffic groups.

Accordingly, in this section the queuing discipline described above in section B is generalized to accommodate a number of traffic groups, with each group being allocated a minimum portion of the network resources which is protected against excessive traffic in the other groups.

In general, a network carries g groups of traffic indicated by g=1, . . . ,G. Each group g has a protected share of transmission capacity $C^g{}_l$ on each link l in the network, where the sum of the shares $C^g{}_l$ on a link l does not exceed the total transmission capacity $C_l$.

In a traffic group g, there may be $p_g=1, \ldots ,P_g$ loss priority classes. In each group, the highest loss class $p_g=P_g$ is for packets which require loss-free transmission. Illustratively, each connection in the network is set up as part of one traffic group. The packets of a connection all belong to the same traffic group, but they may be associated with different loss priority classes within that traffic group. The traffic group as well as the priority class of a packet should be indicated in its header.

In order to have loss-free transmission for the traffic of the loss-free priority class $P_g$ in a traffic group g, the following admission policy is utilized: The aggregate length of packets of each connection k of group g which are admitted with priority $P_g$ should be limited to a maximum of $r_k \cdot T$ bits in a frame of duration T, such that the sum over $r_k$ for all connections k in group g and with loss priority class $P_g$ traversing a link l does not exceed $C^g{}_l$.

When multiple traffic groups are utilized, the queuing discipline at the network nodes is based on the following rules.

a. Consider a node n, an incoming link l', an outgoing link l, and a packet which has arrived during an arriving frame F' of incoming link l' and which seeks service by the outgoing link l. Let F be the departing frame of link l that is adjacent to the arriving frame F'. The packet does not become eligible for transmission by l until the beginning of frame F.

b. During each departing frame of outgoing link l, service should be offered to the eligible traffic of each group g for a time $t^g{}_l = T(C^g{}_l/C_l)$. If group g runs out of eligible packets before receiving $t^g{}_l$ seconds of service, the rest of its service share can arbitrarily be offered to other traffic groups.

c. While the service of outgoing link l is being offered to the traffic of group g, the eligible packets of group g which belong to higher loss priority classes should be offered service before packets which belong to a lower loss priority class.

d. Any eligible packet which does not receive service in the corresponding departing frame F is dropped.

Figure 6:
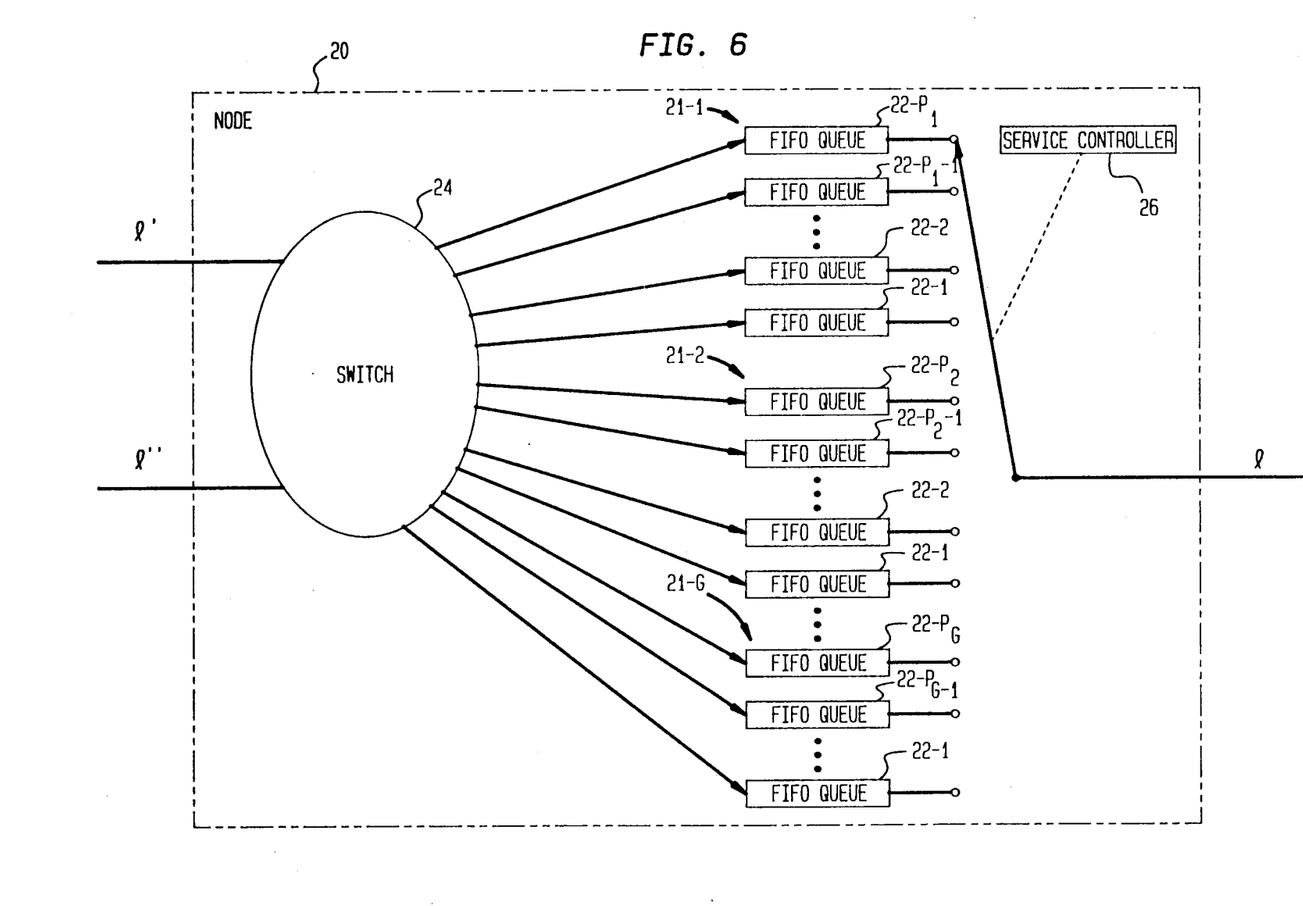
FIG. 6 schematically illustrates a node structure for use with multiple traffic groups when the duration limited statistical multiplexing transmission strategy is utilized, in accordance with an illustrative embodiment of the present invention.

FIG. 6 shows a node 20 which implements the above-described queuing discipline when the arriving frames on all the incoming links are synchronous. While in general, a node may include many incoming and outgoing links, the node 20 of FIG. 6 includes the incoming links l' and l" and the outgoing link l.

Associated with the outgoing link l are the queue groups 21-1, 21-2, . . . 21-G. There is one queue group 21-g for each traffic group g,g=1, . . . ,G. Each queue group 21-g includes one FIFO queue 22-1, 22-2, . . . ,22-Pg-1, 22-Pg for each loss priority class $p_g=1, \ldots ,P_g$ in the traffic group g. Packets arriving on the incoming links l' and l", and destined for the outgoing link l, are routed by the switch 24 to the appropriate FIFO queue based on traffic group and loss priority class indicators contained in the packet headers. For example, a packet whose header indicates the traffic group g=1 and loss priority class $p_1=P_1$ is routed by the switch 24 to the queue group 21-1 and to the specific FIFO queue 22-$P_1$ contained in the queue group 21-1.

At a time $\theta_l$ seconds prior to the beginning of a departing frame F on the outgoing link l, the service controller 26 designates the loads present in the queues as eligible for transmission during the departing frame F. This can be done by marking the last packet in each queue at that moment. Any packet which arrives afterward is not eligible for transmission during the departing frame F and should wait until a subsequent frame. During the departing frame F, the service controller 26 spends $t^g_l$ seconds serving the queues in each queue group 21-g, g=1, . . . ,G. The order with which different queue groups are served is immaterial, however, within each group, higher loss priority class queues should be served first. If a group g runs out of eligible packets before receiving $t^g_l$ seconds of service, the service controller proceeds to the next group. After all groups have received their due service time, the service controller should continue to serve any group with remaining eligible packets until the frame expires. Should all of the groups run out of eligible packets, the service controller remains idle until the beginning of the next departing frame. However, any packets which are not served by the outgoing link l in the frame for which they are eligible for such service are dropped.

When the foregoing strategy is used to transmit packets in a network, a buffer capacity of at most $3C_l.T$ insures that packets in the highest loss priority class of each group (i.e. $p_g=P_g$) have no buffer overflow losses. In addition, any packet which is not dropped in accordance with the above-described queuing discipline has a guaranteed bounded end-to-end delay. In particular, the total queuing delay for a packet of a connection k comprises a constant delay term between HT and 2HT (which is fixed for the connection) and a delay jitter term which is between $-T$ and T. Here H is the number of links in the connection. In addition, the loss probability of a packet with priority $p>1$ is not affected by the traffic of priority $p'<p$ in the same group. Furthermore, packets of a connection k will preserve their order throughout the network regardless of the differences in their priorities, given that during an arriving frame on the access link for connection k, the admitted packets of the connection k which have a higher priority precede those packets which have a lower priority.

E. Heterogeneous Time Frames

The duration limited statistical multiplexing strategy described so far is based on a uniform frame size T used throughout the network. The frame size has a significant impact on network performance. First a larger frame size provides a better multiplexing gain in the duration limited statistical multiplexing strategy of the present invention because fluctuations in the traffic are averaged out over longer time periods. A larger frame size also provides more flexibility and granularity in the allocation of transmission rates to individual connections. However, the end-to-end delay for a given connection increases almost proportionately with the increase in frame size and the required buffer space per link scales up roughly in proportion to the frame size.

If a single frame size is to be used in the network, its duration must be chosen by careful consideration of the foregoing tradeoffs. However, in view of the various delay and bandwidth requirements that different applications have, it is advantageous to allow for multiple frame sizes in the network, so that traffic for different applications can be transported in individually suitable frame sizes.

To incorporate multiple frame sizes, each traffic group g has its own frame size Tg. This is referred to as a type-g frame. Some of the traffic groups have the same frame size. Without loss of generality, the traffic groups are labelled in descending order of corresponding frame size. It follows that of g=1, . . . ,G−1, $T_g = K_g.T_{g+1}$, $K_g$ being an integer larger than or equal to one.

Figure 7A:
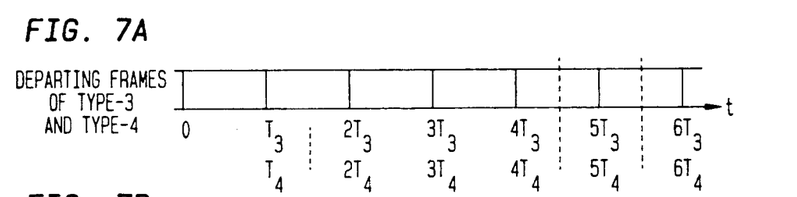
FIGS. 7A, 7B, 7C and 7D illustrate frames of multiple durations on a link in the network of FIG. 1.
Figures 7B, 7C:
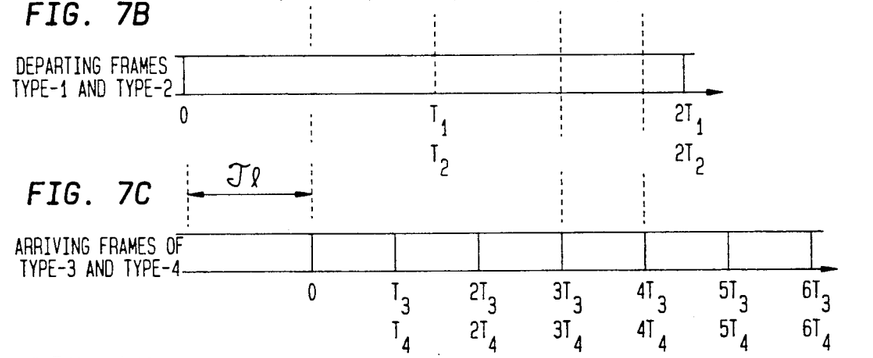
Figure 7D:
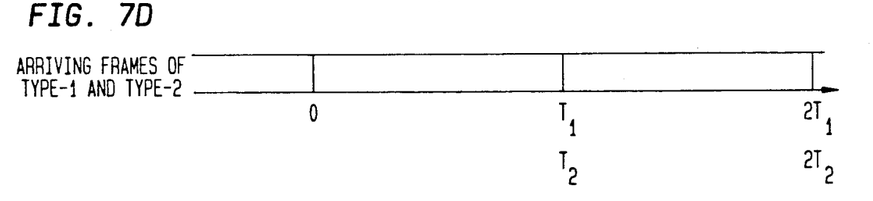

As an example, consider a network with G=4 traffic groups and two frame sizes, one three times bigger than the other and each used by two traffic groups. In this case, $T_1=T_2=3T_3$ and $T_3=T_4$. For this example, the departing and arriving frames over a link l are illustrated in FIGS. 7A, 7B, 7C, 7D. In particular, FIG. 7A shows departing type-3 and type-4 frames at the transmitting end of a link l. Similarly, FIG. 7B shows departing type-1 and type-2 frames at the transmitting end of the link l. Note the frames of different sizes on the link l are synchronous. FIG. 7C shows the type-3 and type-4 frames as they arrive at the receiving end of the link l and FIG. 7D shows the type-1 and type-2 frames at the receiving end of the link l. The time $\tau_l$ is the propagation delay of the link.

In order to describe the queuing discipline used at the network nodes in the case where multiple frame sizes are utilized, it is useful to extend the definitions of adjacent frames and phase mismatch between two links. In particular, at a node n, an arriving type-g frame $F_g'$ of an incoming link l' and a departing type-g frame $F_g$ of an outgoing link l comprise an adjacent pair, if $F_g$ is the first departing type-g frame of l that starts on or after $F_g'$ expires. The time between the end of $F_g'$ and the beginning of the adjacent frame $F_g$ is defined as the phase mismatch of type-g between link l'0 and link l and is denoted by $\theta^g_{l'l}$. The phase mismatch $\theta^g_{l'l}$ is between zero and Tg.

Figure 8A:
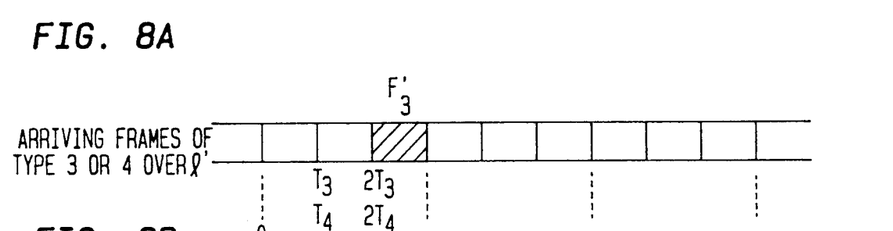
FIGS. 8A, 8B, 8C, and 8D show arriving frames of multiple duration on an incoming link of a node and departing frames of multiple duration o an outgoing link of a node.
Figure 8B:
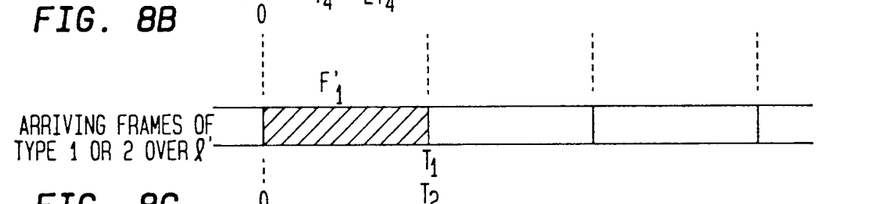
Figure 8C:
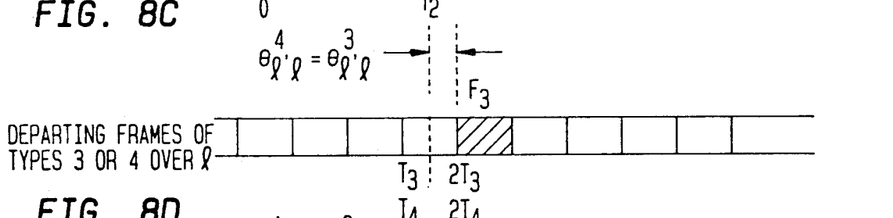
Figure 8D:
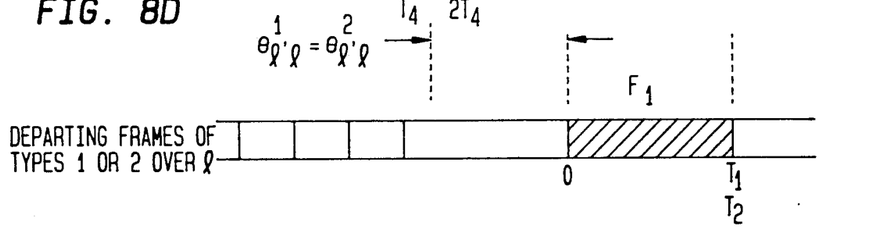

This definition of adjacent frames is illustrated in FIG. 8A, 8B, 8C, and 8D. FIG. 8A shows the type-3 and type-4 frames defined above arriving at a node n via an incoming link l'. FIG. 8B shows the type-1 and type-2 frames arriving at the node n via the link l'. FIG. 8C shows departing type-3 and type-4 frames on an outgoing link l of the node n and FIG. 8D shows departing type-1 and type-2 frames on the outgoing link l of the node n. The FIGS. 8A, 8B, 8C, and 8D indicate a pair of adjacent type-3 or type-4 frames $F'_3$ and $F_3$ and a pair of adjacent type-1 or type-2 frames $F_1'$ and $F_1$. The phase mismatches $\theta^4{}_{rl} = \theta^3{}_{rl}$ and $\theta^1{}_{rl} = \theta^2{}_{rl}$ are also illustrated.

Before describing the queuing discipline used at the network nodes in the case of multiple traffic groups g, $g = 1, \ldots, G$, with multiple frame sizes Tg, it is useful to add one more provision to the transmission strategy. In particular, it is useful to add one more traffic group to the strategy which is denoted as the $g = 0$ traffic group. If the $g = 0$ traffic group is utilized some transmission capacity $C^0{}_l$ is allocated on each link l to the $g = 0$ traffic group. The purpose of the $g = 0$ traffic group is as follows. The duration limited statistical multiplexing transmission strategy including the queuing discipline at the network nodes wherein arriving packets are delayed and become eligible for transmission in the adjacent departing frame is most suitable for traffic with stringent delay requirements. However, some traffic may not have any stringent delay requirements and this type of traffic will belong to the $g = 0$ traffic group.

The queuing discipline at the network nodes is as follows:

a. Consider a node n, an incoming link l', an outgoing link l, and a traffic group g, $g = 1, \ldots, G$. Consider a packet belonging to group g that has arrived at the node n during a type-g frame $F_g'$ of link l' and seeks service by the outgoing link l. Let $F_g$ be the departing type-g frame of link l that is adjacent to the arriving frame $F_g'$. The packet does not become eligible for transmission by l until the beginning of frame Fg. Packets in the group $g = 0$ are always eligible for transmission.

b. During the departing frame $F_g$, $g > 0$, the outgoing link l should offer its service to the eligible traffic of group g for at least $t^g{}_l = T_g(C^g{}_l/C_l)$ seconds. While group g has eligible packets and has not received a total service time of $t^g{}_l$ seconds, it is called an active group. When the group g receives its due service time $t^g{}_l$ or when it runs out of eligible packets, it becomes a passive group and remains passive for the rest of frame $F_g$. As is described below, a passive group which has eligible packets might still receive some additional service referred to as bonus service time.

c. During each departing type-1 frame of link l, link l should offer its service to the traffic of group $g = 0$ for at least $t^0{}_l = (C^0{}_l/C_l)T_1$ seconds. While group $g = 0$ has not received a total service time of $t^0{}_l$ seconds, it is called an active group regardless of whether or not there is a packet waiting in that group. When it receives $t^0{}_l$ seconds of service, it becomes passive and remains passive for the rest of the current departing frame of type-1.

d. Consider a link l and an active traffic group $g \neq 0$. Let g' be another traffic group and assume that either $g' = 0$ or $T_g < T_{g'}$. At any instant of time, the eligible traffic of type g has non-pre-emptive priority over the eligible traffic of type-g'. This means that if a type-g packet becomes eligible for service while a type-g' packet is being served, the type-g packet awaits for completion of the type-g' packet before gaining control of the link.

e. In a given traffic group g, the eligible packets of higher loss priority class (larger $p_g$) are served before those in a lower loss priority class (smaller $p_g$).

f. Any eligible packet of type $g \neq 0$ which does not receive service by the end of the departing frame for which it is designated as eligible for service shall be dropped out.

g. When all of the queues are passive or when there is no eligible packet in any active queue, the server offers service to the eligible packets of passive queues until new queues become active. When there are no eligible packets in any queue, the server remain idle.

The above-mentioned bonus service time is available on a link l if the link l has some unallocated transmission capacity or a traffic group g does not utilize its full share of transmission capacity on a link.

Figure 9:
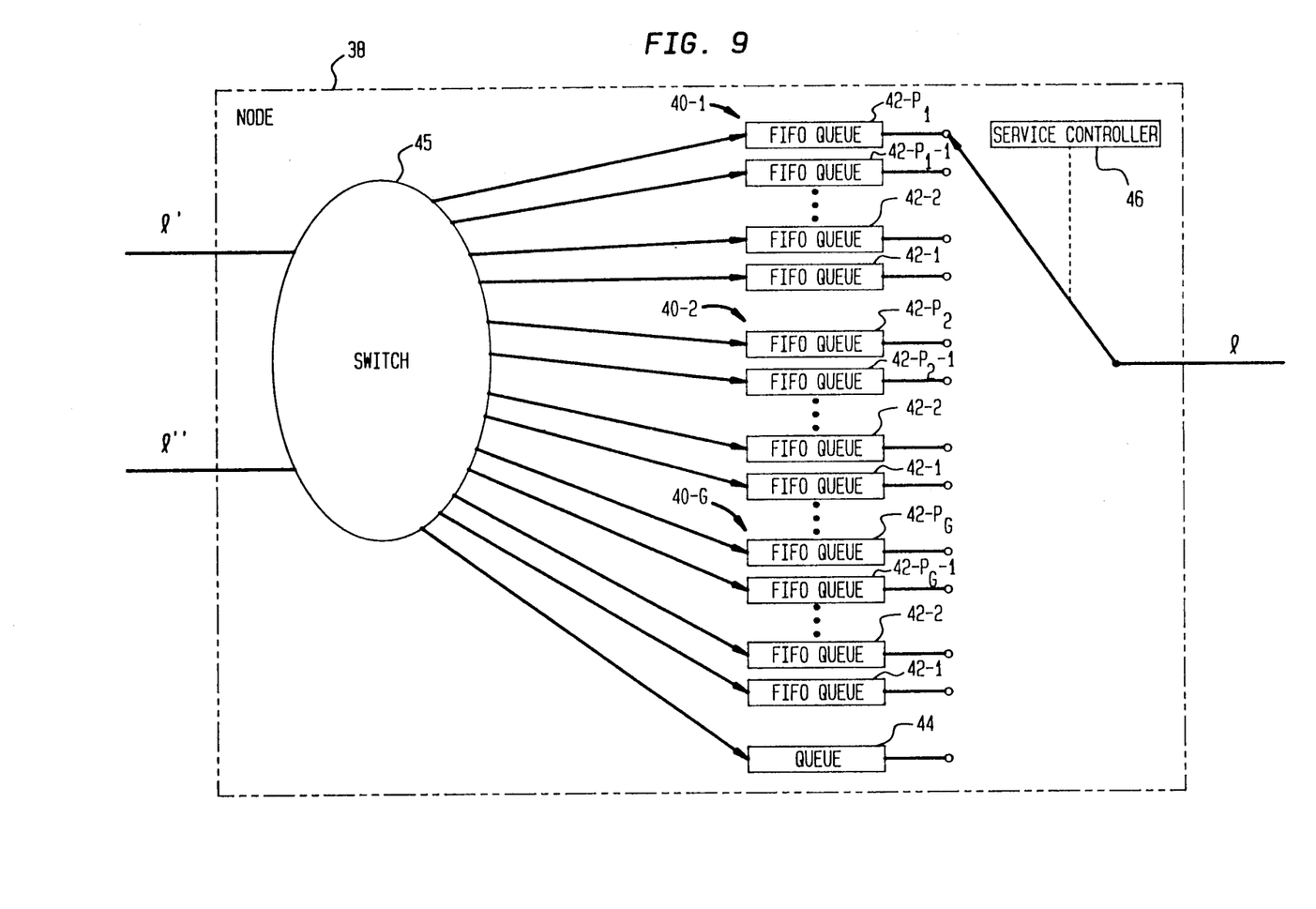
FIG. 9 schematically illustrates a node structure for use with frames of multiple duration and multiple traffic groups when the inventive duration limited statistical multiplexing transmission strategy is utilized, in accordance with an illustrative embodiment of the present invention.

FIG. 9 shows the structure of a node 38 for carrying out the queuing discipline as described by the rules a-f above. For illustrative purposes only, the node 38 of FIG. 9 is shown as having two incoming links l' and l" and one outgoing link l, but in general such a node has many incoming and outgoing links. The node structure 38 of FIG. 9 is applicable to the case, where for each group g, $g \neq 0$, the arriving type-g frames on the incoming links l' and l" are synchronous. This means that the phase mismatch between the type g frames on an outgoing link l and any incoming link l' or l" is the same and is denoted by $\theta^l{}_g$. Thus, any type-g, $g \neq 0$, packet which has arrived at the outgoing link l at least $\theta^g{}_l$ seconds prior to the beginning of a departing type-g frame Fg is eligible for transmission during $F_g$, regardless of the particular incoming link on which the packet arrived. This condition makes the node 38 of FIG. 9 implementable through use of a simple queuing structure.

Associated with the outgoing link l are the queue groups 40-1, 40-2, ... 40-G. In other words, there is one queue group 40-g for each traffic group g, $g = 1, \ldots, G$. Each queue group 40-g includes one FIFO queue 42-1, 42-2, ..., 42-$P_g$−1, 42-$P_g$ for each loss priority class $p_g$ in group g, $p_g = 1, \ldots, P_g$. There is also an additional queue 44 which may or may not be a FIFO queue for the group $g = 0$ traffic. Packets arriving on the incoming links l' and l" are routed by the switch 45 to the queues 42 associated with the link l based on traffic group and loss priority class indications contained in the packet headers.

At a time $\theta^g{}_l$ seconds prior to the beginning of each departing type-g frame Fg on outgoing link l, $g > 0$, the service controller 46 designates the loads present in the queues of the group 40-g as eligible for transmission during frame $F_g$. This can be done by marking the last packet of each queue of group 40-g at that moment. Any packet of group g which arrives afterward is not eligible for transmission during $F_g$ and should wait until a subsequent type-g frame starts. At any time, the service controller 46 should offer service to the active group with the largest g. If there is no active group, bonus service may be offered to a passive group. Within a given active or passive group, service should be offered to the highest loss priority queue with remaining eligible packets. When there are no eligible packets in any group the service controller 46 is idle. At the beginning of new departing frames on link l, when some passive groups become active and new packets become eligible, transitions among queues should take place on a non-preemptive basis. It should be noted that packets in the queue 44 are always eligible for transmission.

When the foregoing transmission strategy and node structure are utilized including the use of multiple frame sizes and loss priority classes, the following desirable properties result. A buffer space of at most $3C_l/T_1$ per link l eliminates buffer overflow and associated packet losses for the highest loss priority class $p_g = P_g$ in each group g, $g \neq 0$. In addition, the end-to-end bounded delay for a packet of a connection k of a group g comprises a constant delay term between HTg and 2HTg (which is fixed for the connection) and a jitter delay between $-$Tg and Tg. The foregoing transmission strategy also protects higher loss priority packets against excessive traffic in lower priority classes. The foregoing transmission strategy is also order preserving. Packets of a connection k in a group $g \neq 0$ will preserve their order regardless of the differences in their priorities, given that during any arriving frame on the access link of connection k, the admitted packets of connection k with higher priority precede the packets with lower priority.

It should be noted that the use of multiple loss priority classes together with the use of multiple frame sizes provides a transmission scheme which enables each type of traffic having a particular delay and loss tolerance to be matched to a corresponding loss priority class and transmission group for efficient transmission.

Conclusion

A duration limited statistical multiplexing method and associated node structure for the efficient and reliable transmission of delay sensitive traffic in a packet network is disclosed. The duration limited statistical multiplexing strategy provides bounded end-to-end delay and loss-free transmission for the fraction of the delay sensitive traffic which has such a stringent requirement. To achieve statistical multiplexing gain, some loss is permitted for the rest of the delay sensitive traffic, with discrimination among different priority classes based on the corresponding degree of loss sensitivity. Bounded end-to-end delay is obtained by performing statistical multiplexing at the network nodes on a duration limited basis through use of a unique queuing discipline at the network nodes. Different traffic groups, based on possibly different frame sizes, may be incorporated into the strategy in order to meet a variety of end-to-end delay requirements as well as to provide additional flexibility.

An important advantage of the duration limited statistical multiplexing transmission strategy of the present invention is that the probability of a particular connection encountering successive packet losses is substantially reduced. The reason is that packets travel in isolated frames. A condition of overload at a link during a particular frame does not extend to the next frame as unserved packets are dropped. Thus, packet losses are diversified and the risk of correlated packet losses is reduced. When packet losses are relatively uncorrelated, a larger rate of loss for the packets of an application may be tolerated.

Finally, the above-described embodiments of the invention are intended to be illustrative only. Numerous alternative embodiments may be devised by those skilled in the art without departing from the spirit and scope of the following claims.

I claim:

1. A method for transmitting delay sensitive packets in a packet switching network comprising a plurality of nodes interconnected by links, said method comprising the steps of:

assigning each of said packets to a specific loss priority class out of a plurality of loss priority classes before the packet is transmitted between nodes in the network, designating at each node in said network, a packet arriving in a specific arriving frame at said node as eligible for transmission during a specific department frame on an outgoing link which is adjacent to said specific arriving frame in which the packet arrived at said node, and transmitting during said adjacent frame on said outgoing link packets eligible for transmission in an order determined by loss priority class, and dropping eligible packets which cannot be served before the expiration of said adjacent frame.

2. The method of claim 1 wherein time frames of different durations are defined on said links and different ones of said packets are transmitted in said time frames of different durations, a packet arriving at a node in an incoming time frame of a particular duration being eligible for transmission in an adjacent departing frame of the same duration.

3. The method of claim 1 wherein said packets transmitted in said network are assigned to different traffic groups, and wherein the duration of said adjacent frame on said outgoing link is divided among the packets of said different traffic groups eligible for transmission during the adjacent frame such that each traffic group receives a predetermined share of the transmission capacity of said outgoing link, within each traffic group the packets being served by the outgoing link in an order determined by loss priority class.

4. The method of claim 1 wherein packets in the highest loss priority class are guaranteed transmission without loss and with a bounded delay between a source node and a destination node.

5. The method of claim 4 wherein packets in each lower loss priority class are transmitted between a source node and a destination node with a bounded end-to-end delay and with an end-to-end loss rate probability which does not exceed a predetermined maximum.

6. The method of claim 1 wherein packets are transmitted between a source node and a destination node with a jitter delay that is bounded by a frame duration.

7. The method of claim 1 wherein packet losses in a higher loss priority class are not affected by the amount of packets in a lower loss priority class.

8. The method of claim 1 wherein each of said packets belongs to a connection which extends between a source node and a destination node in said network and wherein said method comprises the step of admitting a particular connection k to said network if on each link in a path between a source node and a destination node of the connection k a transmission bandwidth $r_k$ is available such that the aggregate length of packets of the connection k in the highest loss priority class does not exceed $r_k \cdot Tg$, where Tg is a frame duration with which the connection k is associated.

9. The method of claim 8 wherein said method comprises admitting a particular connection to said network having packets in a lower loss priority class if the end-to-end loss probability for said packets in said lower loss priority class will not exceed a predetermined maximum and if the admission of said packets in said lower loss priority class will not cause the end-to-end loss probability for an already admitted connection to exceed a maximum loss rate of the already admitted connection.

10. The method of claim 9 wherein the packets belonging to a connection preserve their order throughout the network even when the packets belong to different loss priority classes.

11. The method of claim 9 wherein successive packet losses in a connection are substantially uncorrelated.

12. A method for transmitting delay sensitive packets belonging to particular connections between a source node and a destination node in a packet switching network comprising an array of nodes interconnected by links, each of said connections belonging to a particular traffic group g. $g=1, \ldots, G$ and each of said packets belonging to a particular loss priority class $p_g$ out of a plurality of loss priority classes $p_g = 1, \ldots, P_g$ associated with each traffic group, each of said traffic groups being allocated a predetermined fraction of the transmission capacity on each link, said method comprising the steps of:

on each link in said network, defining a sequence of time frames for each traffic group, the time frames on each link for the traffic group g having a duration Tg, admitting a connection k to the network in a traffic group g only if a transmission bandwidth $r_k$ is available for the traffic group g on each link in a path between a source node and a destination node for the connection k such that the aggregate length of packets of the connection k in the highest loss priority class $P_g$ does not exceed $r_k Tg$ in a frame of duration Tg, and delaying a packet belonging to the traffic group g and arriving at a node of said network on an incoming link during a specific arriving frame of duration Tg and addressed for transmission by an outgoing link at least until the beginning of an adjacent departing frame of duration Tg on the outgoing link, and dropping any packet which cannot be served by an outgoing link in its corresponding adjacent departing frame.

13. The method of claim 12 wherein within each traffic group packets are served by an outgoing link according to loss priority class.

14. The method of claim 12 wherein excess packet traffic in one traffic group does not affect the transmission of packets in another traffic group.

15. The method of claim 12 wherein all of said connections belong to a single traffic group, and only a single sequence of time frames of a single duration T is defined on each link of said network.

16. The method of claim 12 where said admitting step comprises admitting connections with packets in a lower loss priority class only if the end-to-end loss rate probability for such packets will not exceed a predetermined maximum and if the admission of such packets will not cause the end-to-end loss rate probability of packets of an already existing connection in said network to exceed a predetermined maximum for the already existing connection.

17. The method of claim 12 wherein packets are served in an adjacent frame of an outgoing link in accordance with loss priority class and said dropping step comprises dropping packets only in the lower loss priority classes.

18. The method of claim 12 wherein a new connection is admitted to the network only if its admission will not modify the packet loss rate of an already existing connection in such a way that the packet loss rate of an existing connection will be increased beyond a predetermined tolerance level.

19. A node for use in a packet network for routing delay sensitive packets, each of said delay sensitive packets belonging to a particular connection in a particular traffic group and belonging to a particular loss priority class, said node comprising a plurality of incoming and outgoing links, receiving means for receiving said delay sensitive packets via said incoming links, said receiving means receiving each of said packets belonging to a particular connection of a particular traffic group in arriving frames of a particular duration associated with the particular traffic group, storage means associated with each of said outgoing links for storing said packets addressed for transmission on each of said outgoing links, and controller means associated with said storage means for controlling the transmission of said received packets on said outgoing links by designating each of said received packets being received in an arriving frame of a particular duration as eligible for transmission in a first departing frame of said particular duration on the outgoing link to which said each received packet is addressed which starts at or after the end of the frame of said particular duration in which said each received packet arrived at the node and by enabling each outgoing link to serve the packets designated as eligible for service by it during a department frame in an order determined by the loss priority class of the eligible packets, whereby packets which cannot be served by the outgoing link to which they are addressed in the departing frame for which they are designated as eligible are dropped.

20. The node of claim 19 wherein said receiving means comprises a switch.

21. The node of claim 19 wherein said storage means associated with each outgoing link comprises a set of FIFO queues for each traffic group, each set of FIFO queues containing a single FIFO queue for each loss priority class in the corresponding traffic group.

22. The node of claim 21 wherein said node belongs to a network which carries packets belonging to a single traffic group in frames of duration T and wherein said storage means associated with each outgoing link comprises a single set of FIFO queues, the set of FIFO queues associated with each outgoing link comprising one FIFO queue for each loss priority class in said single traffic group.

23. The node of claim 19 wherein said node comprises additional storage means associated with each outgoing link for storing non-delay sensitive packets.

24. The node of claim 19 wherein said controller means always causes packets in the highest loss priority of each traffic group to be transmitted by the desired outgoing link in the frame in which said packets in the highest loss priority class are designated as eligible for transmission.

25. The node of claim 19 wherein there is only one traffic group and all of said frames are of duration T.

26. The node of claim 19 wherein said controller means controls the transmission of said packets on said outgoing links based on the aggregate number of packets in each of said loss priority classes seeking service by each outgoing link, and without having to monitor the packets of each connection individually.

27. A method of transmitting delay sensitive packets in a packet switching network comprising a plurality of nodes interconnected by links, said method being CHARACTERIZED BY the steps of:

assigning each of said packets to a specific loss priority class out of a plurality of loss priority classes before the packet is transmitted between nodes in the network, designating at each node in said network, a packet arriving in a specific arriving frame at said node as eligible for transmission during a specific departing frame on an outgoing link which is adjacent to said specific arriving frame in which the packet arrived at said node, and transmitting during said adjacent frame packets eligible for transmission in an order determined by loss priority class, and dropping eligible packets which cannot be served before the expiration of said adjacent frame.

* * * * *